United States Patent [19]

From

[11] 4,375,765
[45] Mar. 8, 1983

[54] LEVEL INDICATING DEVICE

[76] Inventor: Joseph From, 31 rue de Champs de Mars, 1050 Brussels, Belgium

[21] Appl. No.: 211,928

[22] Filed: Dec. 1, 1980

[30] Foreign Application Priority Data

Nov. 30, 1979 [BE] Belgium ............................... 198380
Mar. 27, 1980 [BE] Belgium ............................... 199989

[51] Int. Cl.³ ............................................. G01C 5/04
[52] U.S. Cl. .............................. 73/432 HA; 33/377
[58] Field of Search .............. 73/298, 299, 302, 747, 73/729, 730, 731, 432 HA; 33/377

[56] References Cited

U.S. PATENT DOCUMENTS

| | | | |
|---|---|---|---|
| 2,587,998 | 3/1952 | Heath | 33/377 X |
| 2,664,645 | 1/1954 | Qualman | 33/377 X |
| 3,494,202 | 2/1970 | Comey | 33/377 X |

Primary Examiner—Charles A. Ruehl
Assistant Examiner—Joseph W. Roskos
Attorney, Agent, or Firm—David S. Fishman

[57] ABSTRACT

A level indicating device comprises a compressible container, which is charged with a measuring liquid, and a flexible transparent tube having a first end immersed in the liquid within the container. The second end of the tube may be affixed to a support which has a reference level marking means mounted thereon. When the device is in use, the surfaces of the fluid in the container and in the second end of the tube are exposed to the ambient atmosphere whereby, when in equilibrium, both surfaces will be at the same level.

18 Claims, 6 Drawing Figures

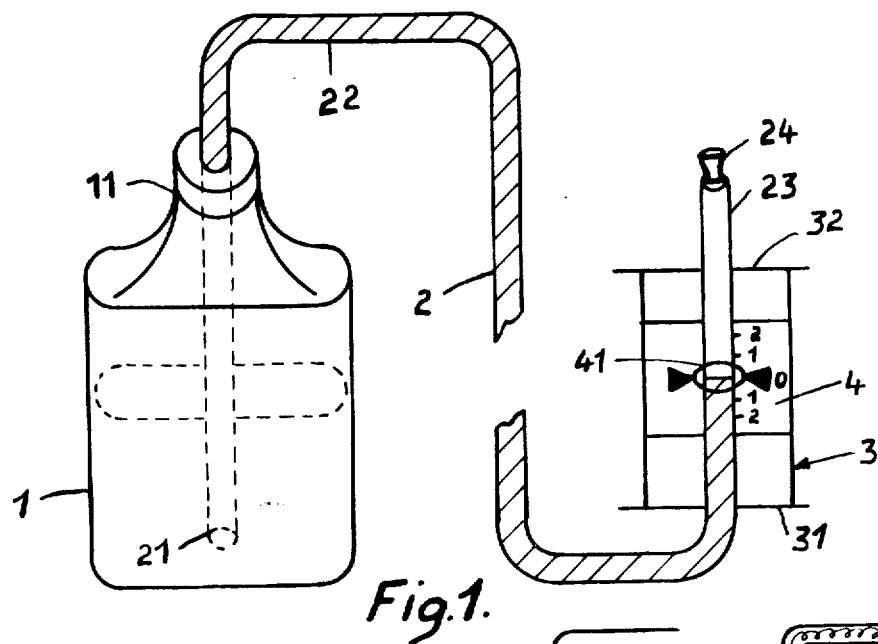
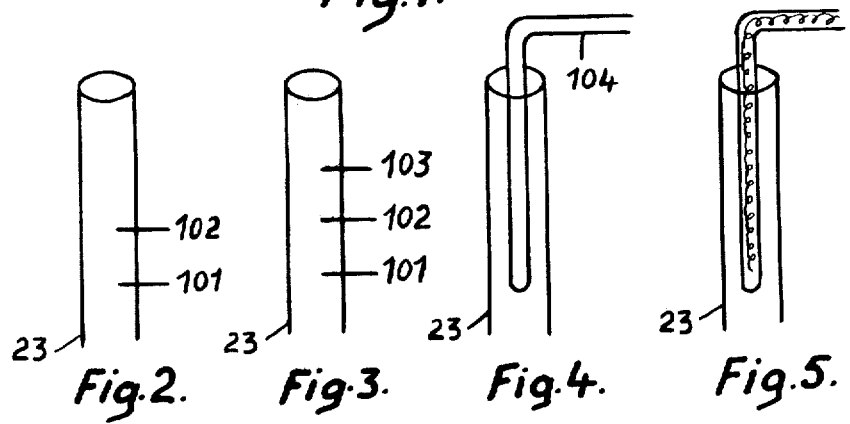
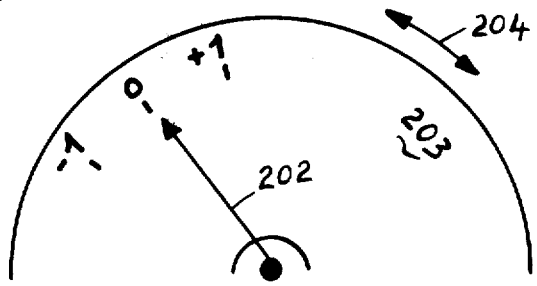

LEVEL INDICATING DEVICE

BACKGROUND OF THE INVENTION (1) Field of the Invention

The present invention relates to apparatus for providing a comparison between the levels of a pair of remotely located points and particularly to liquid type levels of the communicating vessel type. More specifically, this invention is directed to facilitating comparison of the level of a pair of spatially displaced surfaces. Accordingly, the general objects of the present invention are to provide novel and improved apparatus and methods of such character.

(2) Description of the Prior Art

While not limited thereto in its utility, the present invention is particularly well suited for employment in the building industry. In the building and construction industries it is often necessary or desirable to compare the levels of points or surfaces which are positioned at opposite sides of a dividing wall or partition. At the present time, in making such comparison, it is common practice to employ devices which are commonly referred to as "water levels". Such devices include a pair of open topped vessels which are placed in communication via a tube which may, if necessary, function as a siphon. It is well known that the pressure in a fluid is a function of height only, and at the free surfaces is equal to the general atmospheric pressure. Therefore, the free surfaces of the liquid in all communicating vessels will be at the same height. Since the equilibrium conditions within a fluid mass are in no way altered by the shape of the vessel which contains the fluid, the level of the free surface in each leg or communicating vessel will be the same regardless of the cross-sectional area of the leg. In the building industry, it is common practice for both of the communicating vessels to be defined by a tube, which is customarily a flexible transparent plastic pipe, with water being placed in the tube and the operators taking care to prevent the formation of air bubbles.

In accordance with the principle of communicating vessels, after the "water level" has stabilized, the level of the liquid will be the same at both ends of the tube. A first operator, holding one end of the tube, will move this end so that the water will be at the reference or zero level. A second operator, positioned at the opposite side of the wall or partition from the first operator, should theoretically then be able to move the second end of the tube whereby the level assumed by the liquid at this second end will correspond to the reference level. However, in part due to deformation of the tube, the theoretically obtainable result is generally not achieved.

The "water level" devices presently in use suffer from a number of deficiencies. These deficiencies include the difficulty in filling the devices without creating air bubbles, the need for two individuals to operate the devices and the impossibility of calibrating the devices so as to permit precise measurement of levels above and below the reference level. Further deficiencies of presently available "water levels" include the necessity of employing tubes of comparatively large diameter, and thus of increased weight, in order to minimize measuring errors and the ever present danger of spillage of the measuring liquid from either end of the tube in the event of incorrect handling. An additional significant deficiency of presently available levels of the communicating vessel type resides in the sensitivity of the tube to deformation stresses which leads to significant measurement error. It is also to be noted that the transparent plastic tubes commonly in use have a tendency to become cloudy, as a result of surface abrasion and other causes, and the consequent loss of transparency makes use difficult and degrades accuracy.

SUMMARY OF THE INVENTION

The present invention overcomes the above-briefly discussed and other deficiencies and disadvantages of the prior art by providing a novel and improved technique for comparing the level of a pair of spatially displaced points and a liquid level for use in the practice of such novel technique.

Apparatus in accordance with a preferred embodiment of the invention comprises a compensation vessel and a flexible tube which is connected at one end to the vessel. The tube is transparent and, at its opposite end, will be opened to the atmosphere when the device is in use. This apparatus is characterized by the fact that the volume of the compensation vessel is at least equal to the total inner volume of the flexible tube. The apparatus in accordance with the preferred embodiment is also characterized by the provision of means for marking a reference level on the flexible tube.

Also in accordance with the preferred embodiment of the present invention, the cross-sectional area of the interior of the compensation vessel will be at least double the cross-sectional area of the interior of the flexible tube.

Further in accordance with the preferred embodiment of the invention, the free end of the flexible tube is affixed to a support and the means for marking the reference level on the tube comprises an index supported by and moveable on the support.

In the practice of the present invention, it is preferable that the liquid which provides the level indication be colored, thereby facilitating the measurement, and it is additionally desirable to add a wetting agent to this liquid.

It is also advantageous, in the practice of the present invention, to add a fungicide or antiseptic to the liquid in order to prevent the development of algae and other micro-organisms which could form a coating on or otherwise tarnish the interior of the tube at the end where the level reading is to be taken, such a tarnish or coating also impeding movement of the liquid and possibly even obstructing the tube. The addition of an antifreeze agent such as glycol may likewise prove advantageous when the apparatus of the present invention is employed or stored at low temperatures.

In order not to have to empty the tube after each use of the level indicating device of the present invention, the end which is not connected to the compensating vessel is preferably provided with a removable stopper or valve.

Also in accordance with the preferred embodiment of the present invention, in the interest of facilitating the placing of the level device in operation, the compensation vessel is formed from a resilient plastic material whereby the vessel may be squeezed to force the measuring liquid into the tube to begin the siphoning action.

In accordance with one embodiment of the present invention, a lens is provided to facilitate observation of the level of the liquid within the tube at the reading end thereof. The lens may, for example, be provided as part of the moveable index and will permit the liquid level to be observed from a distance.

The present invention also contemplates the inclusion, in the tube, of means for electrically detecting the level of the liquid whereby, if deemed desirable, an audible or visual warning of the liquid reaching the reference level and/or approaching the point where spillage from the open end of the tube is likely to occur may be provided.

BRIEF DESCRIPTION OF THE DRAWING

The present invention may be better understood and its numerous objects and advantages will become apparent to those skilled in the art by reference to the accompanying drawing wherein like reference numerals refer to like elements in the several FIGURES and in which:

FIG. 1 is a schematic illustration of a level device in accordance with the preferred embodiment of the present invention;

FIGS. 2-5 inclusive schematically illustrate further embodiments of the present invention wherein electrical means for detecting the level liquid are provided; and FIG. 6 is a partial schematic illustration of a read-out device for an embodiment of the present invention which produces an electrical signal commensurate with the level of liquid.

DESCRIPTION OF THE PREFERRED EMBODIMENT

Referring now to FIG. 1, a level measuring or comparing device in accordance with the present invention comprises a compensation vessel 1 which is in the form of a flask. The device further comprises a flexible tube 2 and a support member 3. The tube 2 is affixed, by means not shown, to support 3. A moveable index 4 is slideably mounted on support 3. The tube 2 will typically be comprised of a transparent, flexible, plastic material and may be any desired length.

The flask 1 is also preferably comprised of a flexible material and is provided with a screw-type stopper 11 having a tube receiving aperture therein. A first end 21 of tube 2 will pass through stopper 11 and will be hermetically sealed thereto. The tube 2 will, as depicted in FIG. 1, extend almost to the bottom of flask 1.

As an alternative to the construction shown in FIG. 1, the flask 1 could be provided with an opening at the top thereof and a connection for tube 2 at its bottom. However, the provision of openings at the top and bottom of the flask increases the possibility of spillage of the measuring liquid which is contained within the flask.

In the embodiment of the invention depicted in FIG. 1, the portion of tube 2 which includes the upper end 22 functions as a siphon. In order to start the operation of the siphon, the plug 11 is screwed onto flask 1 thus hermetically sealing the flask. Thereafter, the flask is compressed to force the liquid therein into tube 2 and through siphon 22. The plug 11 is then unscrewed in order to restore the atmospheric pressure on the surface of the liquid in flask 1. Once the siphon action has been initiated, the liquid will fill tube 2 up to the equilibrium level in the end 23 thereof. All of the necessary "zeroing" adjustments and further measurements may, after the measuring liquid has filled tube 2, be carried out by a single operator who refers solely to the measuring end 23 of the tube which, as described above, is affixed to the support 3. The initial "zeroing" may be affected by, for example, placing either the base 31 of support 3 or the flat upper part 32 of support 3 in contact with a reference level or surface. When either of base 31 or upper end 32 of support 3 is in contact with a reference surface, the moveable index 4 will be adjusted so that it is aligned with the equilibrium level of the liquid contained in tube 2. Once this initial "zeroing" has been completed, the flask 1 must be kept in its initial position. Flask 1, in order to insure its stability, should preferably be constructed with at least one flat supporting surface and, if necessary, a support device may be provided for the flask which enables the flask to be positioned on an extension of the surface upon which the base 31 of support 3 rests.

Continuing with a description of operation of the present invention, a single operator may freely move the support 3 and note variations in the level of liquid within the tube and/or the achievement of identical levels to the reference level as established during the "zeroing" procedure. Also, because of the way in which the moveable index 4 is preferably graduated, it is also possible to note levels which are situated 1 cm to 2 cm, etc. above and below the zero or reference level.

It is especially to be noted that a single operator may carry out all of the above-described operations without having to refer to the level of the liquid in flask 1 and, in fact, flask 1 does not have to be transparent since all measurements are effected at the free end 23 of tube 2.

It is desirable to minimize the effects of distortion of tube 2 on the movement of the measuring liquid therein. This is accomplished in accordance with the present invention by providing that the cross-sectional area of the compensation vessel (flask 1) is at least twice the cross-sectional area of tube 2. This permits the use of a tube of very small diameter and, in practice, tubes having a diameter of less than 4 mm have been found to be sufficient. The selection of a small diameter for tube 2, in turn, enables the quantity of the measuring liquid to be reduced and thus the weight of the entire device to be also reduced. The use of a tube with a small inner diameter also enables the selection of tubes having a high ratio of wall thickness to diameter and this high ratio reduces the possibility of deformation of the fluid flow path.

The mass of liquid which is set in motion, even with a considerable amplitude in the displacement of liquid in the tube 2, causes only very small variations in the level of liquid in the flask 1 which, therefor, functions as a compensation vessel; the foregoing resulting from the above-mentioned ratio of the cross-sectional area of the flask to that of the tube. Thus, as the ratio between the cross-section of the flask 1 and that of the tube 2 increases, the effectivness of the compensation and the accuracy of the measurements obtained will also increase.

Furthermore, when a fine; i.e., small inner diameter; tube is used as a level indicator, the accuracy of the resulting readings are improved provided, of course, that there is a plane surface of the liquid on which the atmospheric pressure may act. The formation of a planar liquid surface, in a comparatively small diameter tube, is achieved through the addition a wetting or surface-active agent to the liquid. The wetting agent prevents the formation of a meniscus, reduces the tendency for air bubbles to form in the liquid and makes it easier for the liquid to move in the tube thereby reducing the time required to reach the state of equilibrium.

The liquid employed in the practice of the present invention, which will typically be water or alcohol, will preferably have a coloring agent added thereto in addition to a wetting agent. Also, an antispetic and/or antifreeze agent may be added to the liquid. The additives may be prepared in concentrated form for dilution in water and the concentrated preparation containing a plurality of additives can be furnished in a flask, bottle or plastic container.

A removable stopper 24 will typically be provided for insertion in the free end 23 of tube 2 so that the tube does not have to be emptied after each use of the level device of the present invention. As an alternative to a removable stopper, the end 23 of tube 2 may be provided with a valve which can be opened when it is desired to use the apparatus.

As will be obvious from the discussion above, by selecting the tube 2 so that it has a total internal volume which is equal to or smaller than the volume of flask 1, all of the fluid used to make a particular measurement may be returned to and stored in flask 1 after a measurement procedure.

Returning again to a consideration of FIG. 1, it is possible to provide the moveable index 4 with a lens, as indicated at 41, having its optical axis aligned with the tube axis. The lens 41, which will move with index 4, facilitates use of the apparatus, particularly when tubes having a very fine inner diameter are employed, by making it easier to visually observe the level of fluid in the tube 2.

Referring now to FIGS. 2-5, in accordance with the present invention the reading of the level in tube 2 may be accomplished automatically by electrical or electronic devices. In order to accomplish the foregoing, the bearing in mind that the liquid in the flask and tube will have some electrical conductivity, a first contact will be positioned either in flask 1 or tube 2 so as to be in contact with the liquid. A second contact will be inserted, for example by means of a needle, through or into the measuring end of the tube. When the liquid level reaches the position of this second contact an electrical circuit will be completed between the contacts and the resulting current flow may be sensed and employed to cause energization of a lamp or audible warning device. A number of reading contacts may be inserted in the tube at different levels at the measuring end; i.e., in the vicinity of or actually in place of the moveable index 4; and these plural contacts may be used to cause the energization of any desired type of display to indicate different calibrated levels. If the above-mentioned first or mass contact is retained, and a rod introduced into tube 2 as the second contact, the resistance of the circuit between the first or mass contact and rod will vary with the level of the liquid in the tube and this variation in resistance may be monitored to provide an output signal which can be calibrated in terms of the level or units of length. For example, a comparator may be employed to sense the varying resistance and the output of the comparator used to control energization of a lamp or lamps to indicate the level. In such case, after the apparatus has been zeroed, an increase in resistance may be sensed and a signal commensurate therewith generated and used to energize a lamp which shows that the liquid level is too low. Conversely, a decrease in resistance will result in the energization of a lamp which indicates that the liquid level is too high.

In FIGS. 2-5 only the measuring end 23 of tube 2 has been shown. In FIG. 2, the tube is provided with a pair of spaced contacts 101 and 102. The contact 101 may, for example, be connected to ground potential and contact 102 employed as an information contact. When the liquid level in tube 2 increases to a point where it bridges the space between the contacts 101 and 102, an external circuit, not shown in the drawing, will be closed to thereby supply current to a visual or audible alarm. In the FIG. 3 embodiment, an additional contact 103 is inserted in end 23 of tube 2 and, when a current path including contact 103 is completed through the liquid in the tube, a signal will be generated which is indicative of the fact that the level of fluid in the tube is approaching the point where an overflow may occur.

In the embodiment of FIG. 4 a rod 104 has been inserted in the end 23 of tube 2. The electrical resistance of the circuit including rod 104 is continuously monitored. The measured resistance will vary inversely with the length of the rod 104 which is immersed in the liquid. Thus, employing the embodiment of FIG. 4, a reference level may be established and variations in resistance about this reference level will be indicative of the liquid level being either above or below the reference level. These resistance variations may be converted into units of length for display purposes.

In the FIG. 5 embodiment, the ground contact and the measuring or information contact form part of the same probe but are insulated from one another.

FIG. 6 represents a portion of a read-out device in the form of a gage having a moveable pointer 202; the face plate 203 of the gage being calibrated in units of length. The plate or disc 203 will typically be moveable, as indicated by arrow 204, so as to permit alignment of the reference level with the pointer during the zeroing procedure. Thereafter, the pointer will move relative to the dial as, for example, the resistance measured between a pair of contacts varies.

Althoughed preferred embodiments have been shown in the drawing and described above, it is to be noted that various modifications and substitutions may be made thereto without departing from the spirit and scope of the invention. By way of example only, the moveable index 4 may be comprised of a piece of tubing having an inner diameter which corresponds to the outer diameter of tube 2 whereby this piece of tubing, which will have graduations printed thereon, will be slideable on end 23 of tube 2. It is also possible to provide, on end 23 of tube 2, a bracket or other equivalent retaining means whereby the tube may be secured by a fastener or adhesive device to a conveniently available vertical surface. Also, the liquid employed in tube 2 and/or the graduations on the moveable index may be fluorescent, phosphorescent or reflecting in order to enhance the readability of the instrument. Accordingly, it is to be understood that the present invention has been described by way of illustration and not limitation.

What is claimed is:
1. A measuring device comprising:
   a flexible vessel;
   a measuring liquid contained in said vessel;
   a transparent flexible tube having first and second ends, a first end of said tube being inserted in said vessel to a point below the level of the said liquid therein, the second end of said tube being opened to the ambient atmosphere when the device is in use, the volume of said tube being not greater than the volume of said vessel;
   means for selectively hermetically sealing said vessel whereby liquid may be forced from the sealed vessel into said tube by compression of said vessel and the hermetic seal subsequently removed to expose the surface of the liquid in said vessel to the ambient atmosphere; and means for providing an indication of the level of liquid in said tube adjacent the second end thereof.

2. The apparatus of claim 1 further comprising support means for said tube second end, said level indication providing means being moveable on said support means relative to said tube.

3. The apparatus of claim 2 wherein the cross-sectional area of said vessel, measured in a first horizontal plane with the device in use, is at least twice as large as the cross-sectional area of the interior of said tube measured in a second horizontal plane parallel to said first horizontal plane.

4. The apparatus of claim 3 wherein said liquid includes a wetting agent.

5. The apparatus of claim 4 wherein said liquid further includes a coloring additive.

6. The apparatus of claim 3 wherein said tube has an inner diameter of less than 4 mm.

7. The apparatus of claim 2 wherein said reference level indicating means further comprises a lens, said lens facilitating visual observation of the level of fluid within said tube.

8. The apparatus of claim 2 wherein said liquid includes a coloring additive.

9. The apparatus of claim 8 wherein said liquid further includes an additive which prevents the development of algae and other micro-orgainisms.

10. The apparatus of claim 8 wherein said liquid further includes an anti-freeze agent.

11. The apparatus of claim 2 wherein said liquid includes a wetting agent.

12. The apparatus of claim 1 wherein the cross-sectional area of said vessel, measured in a first horizontal plane with the device in use, is at least twice as large as the cross-sectional area of the interior of said tube measured in a second horizontal plane parallel to said first horizontal plane.

13. The apparatus of claim 1 wherein said liquid includes a wetting agent.

14. The apparatus of claim 1 wherein said reference level indicating means further comprises a lens, said lens facilitating visual observation of the level of fluid within said tube.

15. The apparatus of claim 1 wherein said liquid includes a wetting agent.

16. The apparatus of claim 1 wherein said liquid further includes a coloring additive.

17. The apparatus of claim 1 wherein said indication providing means includes at least a pair of spatially displaced electrical contacts which may be immersed in the said liquid.

18. The apparatus of claim 17 wherein at least one of said contacts comprises a resistance element.

* * * * *